Jan. 14, 1964 P. P. POLKO 3,117,647
TRACK FRAME EQUALIZER BAR
Filed Aug. 25, 1961 2 Sheets-Sheet 1

INVENTOR.
Peter P. Polko
Paul O. Pippel
Atty.

Jan. 14, 1964 P. P. POLKO 3,117,647
TRACK FRAME EQUALIZER BAR
Filed Aug. 25, 1961 2 Sheets-Sheet 2
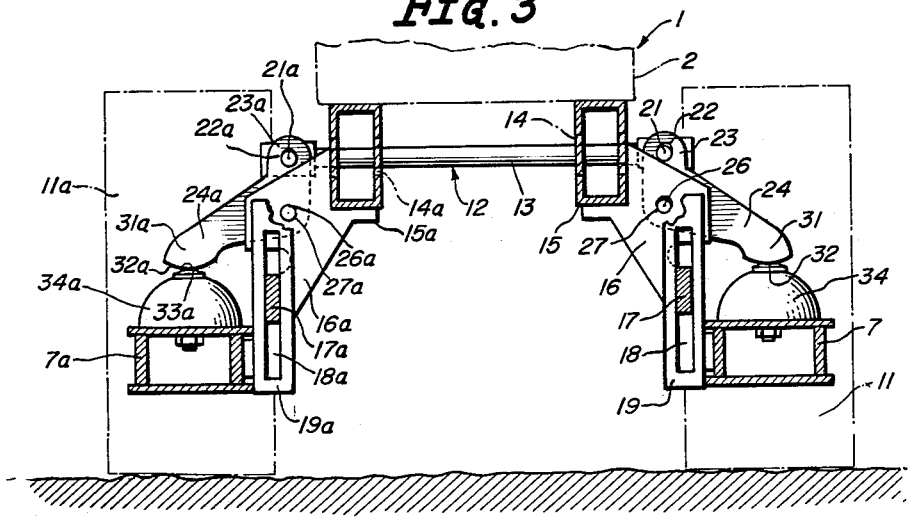
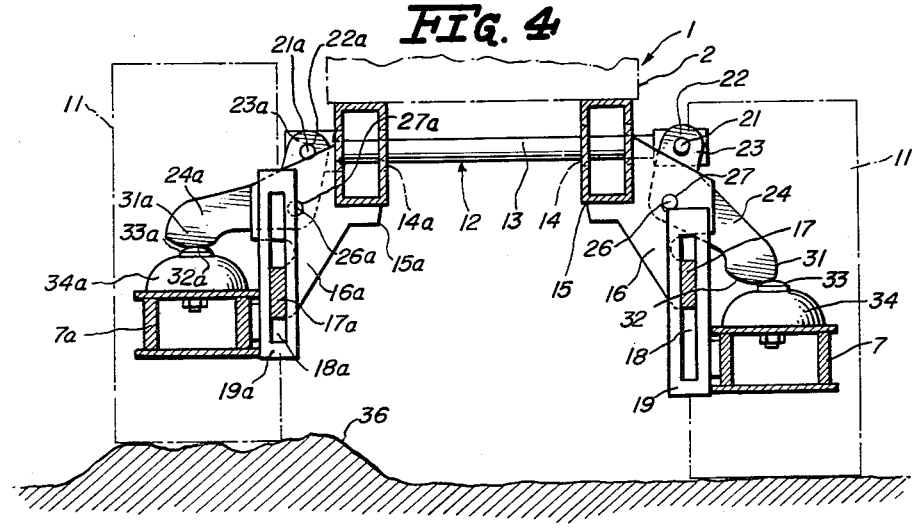
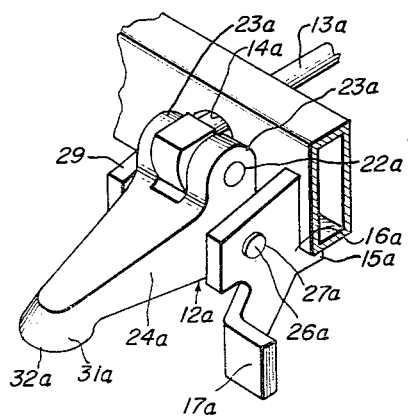
INVENTOR.
Peter P. Polko
Paul O. Pippel
Atty.

United States Patent Office 3,117,647
Patented Jan. 14, 1964

3,117,647
TRACK FRAME EQUALIZER BAR
Peter P. Polko, Lyons, Ill., assignor to International Harvester Company, Chicago, Ill., a corporation of New Jersey
Filed Aug. 25, 1961, Ser. No. 133,854
12 Claims. (Cl. 180—9.5)

This invention relates to suspension of vehicles with respect to its vehicular ground traversing members and in particular relates to suspension of vehicles of the crawler tractor type wherein the suspension occurs forward of its rear pivotal axis to provide vertical adjustment of the main body frame of the tractor with respect to one or more of its track frames.

Present type crawler tractors employ a suspension system having a spring deflection and when either of its track members rolls over an object on the ground the resultant vibrational forces set in motion produce extensive and undesirable oscillation of the body with respect to its ground engaging members and when one of the track members runs over an object the body of the tractor is tilted from the horizontal. This combination of undue oscillation and tilting of the body with respect to the ground hampers the effective use of attached earth-working tools such as a bucket or dozer blade.

It is therefore an object of this invention to provide a vehicular suspension arrangement having minimum oscillation imparted to the body of the vehicle as it traverses over the ground and maintain the body of the vehicle in an upright position.

Another object of this invention is to provide a suspension arrangement for a crawler tractor wherein the body of the tractor is maintained in a horizontal position when either of its track members maintains in a plane transverse to the longitudinal axis of the tractor its original horizontal alignment with respect to the ground when either of its track members runs on an obstruction on the ground.

It is another object of this invention to provide a crawler tractor suspension linkage that provides in a transverse plane to the longitudinal tractor axis a parallelogram action resulting in raising and lowering the front end of the tractor body when either track moves the body of the tractor up and down, the movement of such tractor body being in a horizontal plane.

A further object of this invention is to provide a crawler tractor suspension linkage forward of the rear pivot of the tractor between the body and the track frames and which linkage includes a solid member extending through the body and pivotally supported thereby and reacting and resting on the track frames to provide a rigid suspension during the loading cycle of an attached implement loader and during transport of the load to minimize shock loads transmitted to the tractor body.

A still further object of this invention is to provide a suspension linkage in the form of a cross-bar on the tractor body that allows high ground clearance and therefore minimizes the possibility of damage to the cross-bar during operation of the tractor.

It is still a further object of this invention to provide a suspension arrangement for a crawler tractor vehicle wherein the body or main frame of the tractor will be tilted a minimum amount of time as the track passes over an object on the ground.

A still further object is to provide a spring in a solid suspension cross bar of the tractor compressible in a transverse plane of the tractor to absorb shock overloads to the cross bar.

These and other objects and advantages of the invention will be apparent from the following description taken in conjunction with the accompanying drawings. It will be understood that changes and modifications may be made in the details of the construction and arrangement of parts of the device shown and described without departing from the breath and scope of the appended claims as the preferred form has been given by way of illustration only.

Referring to the drawings:

FIGURE 3 is a sectional view taken along lines 3—3 of FIGURE 2;

FIGURE 4 is a sectional view similar to that shown in FIGURE 3 illustrating the positioning of the cross-bar mechanism as one of the tracks ride over an object;

FIGURE 5 is a sectional view of the novel suspension linkage illustrating the pivotal connections therefor; and FIGURE 6 is a sectional view of a modified form of a portion of the suspension arrangement employing the use of a shock overload spring therefor.

Figure 1:
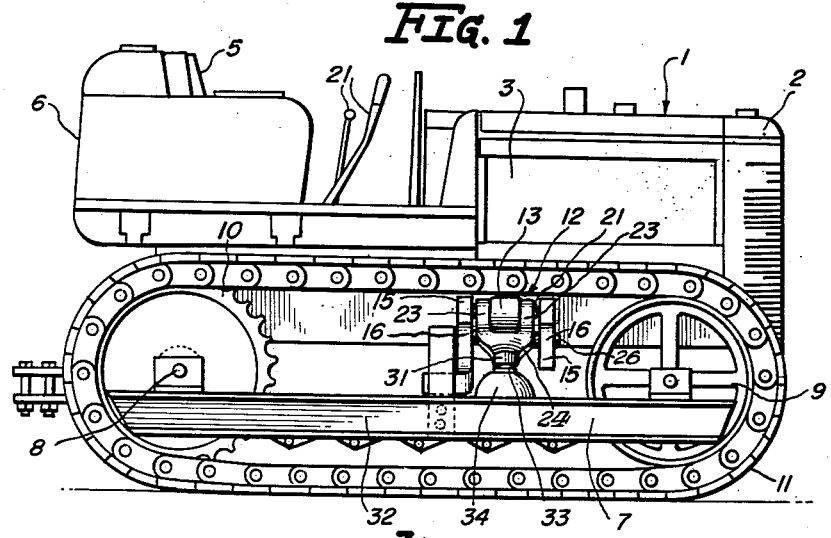
FIGURE 1 is a side-elevational view of a crawler tractor employing my novel suspension arrangement.
Figure 2:
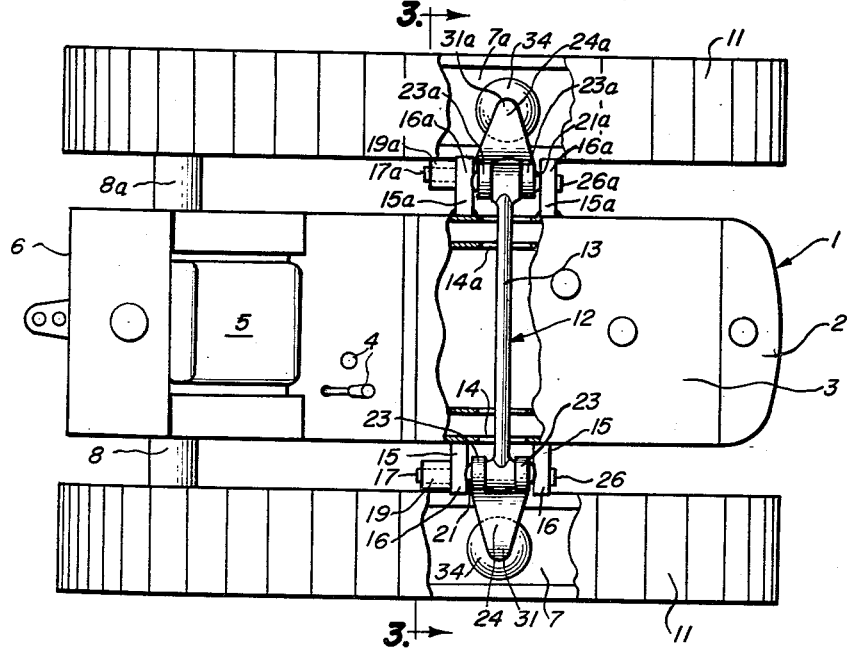
FIGURE 2 is a plan view of the crawler tractor partly in section and showing the novel cross-bar construction.

Referring now to the figures there is shown a vehicle or crawler tractor 1 of the common type and having a body or main frame 2 carrying the usual superstructure including an engine 3, controls 4, operator seat 5, etc. and having opposite sides at its rear end 6 in weight bearing relation to the usual pair of opposed track frames 7, 7a. The points of rear suspension of the main frame 2 are through pivots or pivot axles 8, 8a for pivotally connecting the rear ends of the track frames 7, 7a to the main frame or body 2. The front end of each track frame 7, 7a carries a front idler wheel 9, and the body 2 at its rear end on each side carries a driving sprocket wheel 10 rotatably mounted on axle 8, 8a, there being the usual endless track belts 11, 11a enveloping the frame 7, 7a and the wheels 9 and 10 on each side to raise and fall independently to conform to the ground contour as is common in these tractors.

Because of the dual track arrangement of this vehicle where necessary all the tractor elements on the right side of the vehicle 1 will be indicated by a number and all of the track parts on the left side of the vehicle will have a corresponding number but with the suffix a for purposes of simplified illustration.

The equalizer bar unit is a solid type suspension assembly 12 underposed with respect to the body or main frame 2 forwardly of the rear pivots 8, 8a between the main frame 2 and the track frames 7, 7a and comprises an elongated rigid bar or element 13 passing through tunnels 14, 14a of main frame housing structures 15, 15a integral with the underside of the main frame on the opposite lateral ends thereof. The housing structures 15, 15a carry outwardly extending portions 16, 16a and axially extending guide lugs or keys 17, 17a registering in keyways 18, 18a of guide ways or tracks 19, 19a bolted to the track frames 7, 7a. The outer ends of the rigid bar 13 have openings or holes carrying pivot pins 21, 21a registering with the openings 22, 22a in the upper portions of upward directed ears 23, 23a of yoke elements or bellcrank reaction elements 24, 24a having bores below pins 21, 21a receiving pivot pins 26, 26a therethrough registering with apertures 27, 27a in depending extension blocks or housing structures 16, 16a. The pins 26, 26a under level travel being located generally vertically below pivot pins 22, 22a and the bellcrank suspension elements or reaction elements 24, 24a having outwardly projecting pad engaging parts 31, 31a having downward facing underposed surfaces 32, 32a engaging with crowns 33, 33a of pad elements 34, 34a mounted atop the track frame structures 7, 7a.

With reference now to FIGURE 4 is can be seen that as the forward end 35 of one of the ground engaging elements 11 rides over an obstruction 36, the equalizer bar suspension structure permits the forward end of the ground engaging means 11a and its associated track frame 7a to become elevated with respect to the corresponding ground engaging means 11 and track element 7 to a point where the obstruction 36 engages the underside of the track assembly 7a, 11a approximate the rear pivots 8, 8a maintaining the main frame or body 2 of the tractor in a generally horizontal position but when the rear of the track 11a is approached proximate the pivot 8a the main frame 2 is then caused transversely to tilt from the horizontal. The ability of the main frame 2 to remain horizontal when one or other of the track elements 13 engages an obstacle is accomplished by the particular linkage structure of the suspension unit 12. Ground reaction forces are delivered to the track frame 7 or 7a to the pad 34 or 34a and to element 31 or 31a of the bellcrank reaction element 24 or 24a urging the element 31 or 31a upwardly about pivot pin 26 or 26a and forcing bar 13 through its pivotal connection 22 or 22a to the left or right and in a transverse horizontal direction allowing the track unit 11 or 11a to rise while maintaining the track unit 11a or 11 in an unraised position since its associated bellcrank reaction element is moved about its pivot 26 by the bar 13 moving to the right. The parallelogram motion of the suspension 12 prevents the tilting of the tractor frame and causes movement of the bar 13 with attendant raising of the body frame 2 in horizontal plane, the movement of the bar 13 being only in a horizontal plane through the apertures 14, 14a of the housing structures 15, 15a.

It will be noticed that prior to tilting of the tractor from the horizontal transverse plane the ratio of track rise to equalizer bar rise is 2 to 1, i.e. the body of the tractor moves up or down in a horizontal plane half the distance of the track amplitude until the upper or lower limits of the keyways 18, 18a are contacted by the extensions 17, 17a or when the ground obstruction elevates the rear pivots 8, 8a.

The bellcrank structure permits motion of the bar 12 to which it is connected. The bellcrank structure 24 or 24a is connected to the guide housing structure. The upper limit to which the track unit 11 may be raised is determined by the engagement of the guide with the upper end of the keyway of the guide or structure. This provides smooth vertical travel of the track frame within limits. The arrangement also provides a high clearance for the body frame with respect to the ground over which it is traversing. This is due to the fact that the downward depending pivot support structures 16, 16a are extending downwardly and outwardly at their lower extremity yet, they are so elevated at their upper extremities to sufficiently elevate the frame structure 2 that rests thereupon through the pivotal connections of their reaction members 24, 24a with the trunnion structures 15, 15a and the shifting equalizer bar 12.

FIGURE 6 illustrates a modified form of the suspension system having spring deflection only for absorbing heavy shock loads in that it provides a heavy spring member 38 between elements or portions 39 and 40 of a modified form of the cross bar or equalizer bar 13' shown in the preceding figures providing modified resistance and absorption to heavy ground shock over-loads.

The high cross-bar location minimizes the possibility of damage to the cross-bar during its operation and the linkage itself presents a parallelogram action in planes transverse to the longtiudinal axis of the tractor permitting the raising and lowering of the front end with either track moving the body of the tractor up and down in a horizontal plane approximately half the distance of the track amplitude. This design permits the use of oscillating track frames for both dozer and loader machines. That is, in the case of an attached earthworking tool or implement to the front end of the tractor, a solid bar effect results instead of the current spring deflection and this should minimize the weight action of the dozer blade in soil. In the employment of a front end loader, during the loading cycle, this suspension structure will have the same effect as a rigid bar and during transport of the load the shock loads of the machine will be reduced considerably. Consequently this arrangement gives the operator the same ride characteristics for both attached loader and dozer units.

What is claimed is:

1. In a vehicle, a pair of ground traversing supporting frames, a main frame having pivotal connection with each supporting frame for vertical swinging movement about an axis transverse to the supporting frames and having opposed sides each carrying an extension removed in fore and aft direction from the axis and transverse to a respective supporting frame, a reaction lever at each side of the supported frame and having a first part having connection with the respective extension and a second part having engagement with a respective supporting frame and having a third part, and substantially rigid intervening link means between each lever and having connection with the third part of each lever and having transverse vertical movement in horizontal planes parallel to the ground for raising the supported frame about the axis vertically in horizontal planes upon the raising of one of the supporting frames relative to the other by application of a ground reaction force to said one supporting frame.

2. In a vehicle, a pair of ground traversing supporting frames, an intervening supported frame being pivotally connected with each supporting frame for vertical swinging movement about an axis transverse to the supporting frames and having opposed side portions removed in fore and aft direction from the axis, a pair of reaction levers each having pivotal connection with a respective side portion and having sliding frictional abutment with a respective supporting frame for vertical movement of one lever relative to the other, and link means pivotally interconnecting each lever and located vertically with respect to the pivotal connection of the lever with its side portion and shiftable in transverse horizontal planes in response to vertical movement of one supporting frame relative to the other.

3. In a vehicle, a pair of ground traversing supporting frames, an intervening supported frame being pivotally connected with each supporting frame for vertical swinging movement about an axis transverse to the supporting frames and having opposed side portions removed in fore and aft direction from the axis, a pair of reaction levers each having pivotal connection with a respective side portion and having engagement a respective supporting frame for vertical movement of one lever relative to the other, and substantially rigid link means pivotally interconnecting each lever for minimizing oscillating of the vehicle and located vertically with respect to the pivotal connection of the lever with its side portion and shiftable in transverse horizontal planes in response to vertical movement of one supporting frame relative to the other, said link means providing a front end suspension bar portion having opposed parts and the link means having intervening low compressive resilient means interengaging the parts and providing shock absorption of ground reaction overloads.

4. In a vehicle, a pair of ground traversing supporting frames, a supported frame having independent pivotal connection to each of the supporting frames and swingable vertically about an axis transverse to the supporting frames, substantially rigid suspension means interposed between the supporting and supported frames and removed from the pivotal connection and including a substantially rigid link having opposed ends disposed transversely to the supported frame, and a pair of levers each having a first point of connection to a respective of the opposed ends of the link and a second point of connection to a respective of opposed portions of the supported frame and vertically spaced above the first point of connection in providing substantially high ground clearance of the supported frame, and each lever having an extension outwardly of its second point of pivotal connection having sliding frictional abutment with one of the supporting frames in response to an upward directing force applied to other of the supporting frames with attendant horizontal shifting of the link for vertically positioning the main frame in horizontal planes.

5. In a vehicle, a pair of ground traversing supporting frames, a supported frame pivoted to each supporting frame for vertical swinging movement, ground reaction means pivotally carried on each side of the supported frame and having engagement with a respective supporting frame for suspension of the vehicle, and link means pivotally interconnecting with each reaction means and providing lifting of the supported frame with raising of one of the supporting frames relative to the other, said link means comprising a substantially non-collapsible member in planes of the member in aid of the substantially non-oscillatable lifting of the supported frame.

6. In a vehicle of the type described having a main frame having a part having pivotal connection at one end thereof to a pair of flanking ground engaging members, the combination of a solid suspension structure transversely supporting the main frame on the members between the part and the other end of the vehicle comprising substantially inflexible link means transversely straddling the main frame and having opposed end portions and a pair of bellcrank means, each having pivotal connection on a respective end portion, and being pivotally mounted about the frame and having portions presenting surfaces slidingly and disconnectingly engageable with a respective ground engaging members providing motion of translation of the link means in transverse horizontal planes for raising and lowering the main frame relative to one of the members and in horizontal plane to the ground.

7. The invention according to claim 6 and each ground engaging member being provided with guide ways, and the main frame having opposed sides, each of the sides including projections complementary engaging the respective guide ways to limit vertical travel of the main frame.

8. In a tractive vehicle, a pair of track frames and a main frame having a rear portion connected with the track frames for vertical swinging movement of the main frame thereabout and having forwardly disposed side portions, anti-tilt suspension means interposed between the track frames and comprising a pair of lever arms, each lever arm providing a ground force reaction engagement with a respective track frame and having a part having a pivotal connection with a respective side portion, and link means interconnecting each lever arm above a respective part and providing transverse vertical movement of the levers with the link means in generally horizontal planes for raising the said portions vertically in substantially horizontal planes upon vertical displacement of one track frame relative to other by ground reaction forces, said link means comprising a substantially non-collapsible member in planes in aid of raising said portions, the member extending through the main frame in providing high ground clearance of the vehicle.

9. In a tractive vehicle, a pair of ground traversing supporting track frames, a supported main frame having pivotal connection with each supporting frame for vertical swinging movement about the rear axis of the vehicle transverse to the track frames and having opposed sides each carrying an extension removed forwardly from the axis and transverse to a respective supporting frame, a rigid bellcrank lever at each side of the supported frame and having a first part having a pivotal connection with the respective extension and a second part having a sliding abutting engagement with a respective supporting element transversely and outwardly of the first part and having a third part, and an intervening substantially rigid equalizer cross-bar between each lever and having a pivotal connection with the third part of each lever above its first part and having transverse vertical movement in horizontal planes to the ground for raising the main frame forwardly about the rear axis vertically in horizontal planes upon the raising of one of the track frames relative to the other by application of a ground reaction force to said one track frame.

10. In a vehicle of the type described having a main frame having pivotal connection at one end thereof to a pair of flanking ground engaging members, the combination of a solid suspension structure transversely supporting the main frame on the members between the pivotal connection and the other end of the vehicle comprising link means transversely straddling the main frame and having opposed end portions, and bellcrank means having pivotal connection on each end portion, each bell crank means being pivotally mounted about the frame having portions presenting a surface disconnectedly engageable with a respective ground engaging means providing motion of translation of the link means in a transverse horizontal plane for raising and lowering the main frame relative to one of the members and in horizontal plane to the ground, each ground engaging member having mounted thereon a guide way provided with a guide slot having upper and lower limits, and the main frame having opposed sides, each of the sides including a mounted projection thereon complementary engaging the respective guide slot to restrict vertical travel of the main frame between the limits.

11. In a vehicle of the type described having a main frame having parts having pivotal connection at one end thereof to a pair of flanking ground engaging members and provided with side projections extending toward the members longitudinally removed from said parts, the combination of a solid suspension structure transversely supporting the main frame and interposed between the members comprising rigid link means transversely straddling the main frame and having opposed end portions and paired bellcrank means each having pivotal connection with a respective end portion, each bellcrank means being pivotally mounted on a respective side projection and having a portion presenting a surface engageable with a respective ground engaging means providing motion of translation of the link means in a transverse horizontal plane for raising and lowering the main frame relative to one of the members and in horizontal plane to the ground, and each ground engaging member being provided with a guide way having a guide slot provided with upper and lower limits and the main frame having each of its side projections provided with a guided element complementary engaging the respective guide slot to restrict vertical travel of the main frame between the limits.

12. In a vehicle, a pair of ground traversing supporting frames, an intervening supported frame being pivotally connected with each supporting frame for vertical swinging movement about an axis transverse to the supporting frames having opposed side portions removed in fore and aft direction from the axis, each side portion having a downwardly extending element projecting above a respective supporting frame, a pair of depending reaction levers each having pivotal connection with a respective element and having engagement with topside of a respective supporting frame for vertical movement of one lever relative to the other, and substantially rigid link means extending transversely through each element and pivotally interconnecting each lever above the pivotal connection of the lever with its respective element to provide a high ground clearance of the link means and the link means being shiftable in transverse horizontal planes in response vertical movement of the supporting frames relative to the other.

References Cited in the file of this patent

UNITED STATES PATENTS

| | | |
|---|---|---|
| 1,455,466 | Wickersham | May 15, 1923 |
| 2,223,802 | Heaslet | Dec. 3, 1940 |

FOREIGN PATENTS

| | | |
|---|---|---|
| 1,038,425 | France | May 6, 1953 |